No. 614,356. Patented Nov. 15, 1898.
C. W. WATSON.
HOE.
(Application filed Dec. 22, 1897.)
(No Model.)
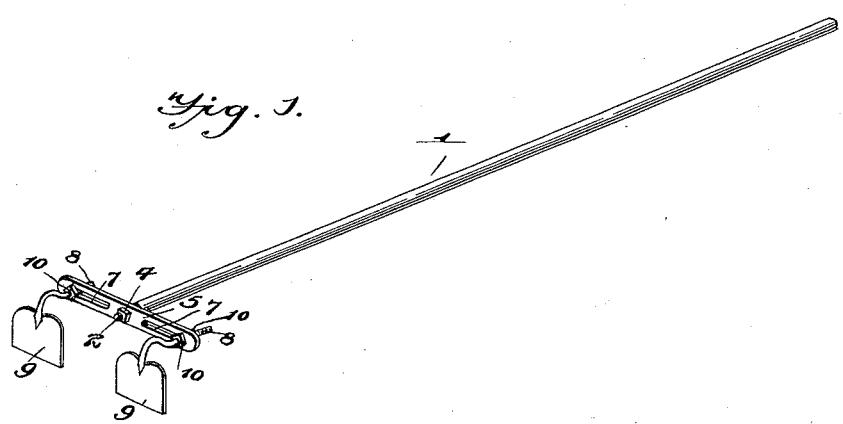
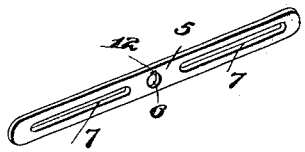
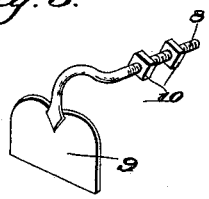
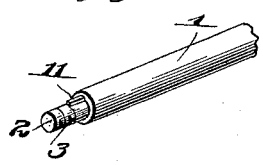
Witnesses
C. E. Hunt.
Harry L. Amer.
Inventor
Charles W. Watson,
by V. S. Stockbridge
his Attorney.

UNITED STATES PATENT OFFICE.

CHARLES W. WATSON, OF WOOSTER, ARKANSAS.

HOE.

SPECIFICATION forming part of Letters Patent No. 614,356, dated November 15, 1898.

Application filed December 22, 1897. Serial No. 662,999. (No model.)

*To all whom it may concern:*

Be it known that I, CHARLES W. WATSON, a citizen of the United States, residing at Wooster, in the county of Faulkner and State of Arkansas, have invented certain new and useful Improvements in Hoes; and I do hereby declare the following to be a full, clear, and exact description of the invention, such as will enable others skilled in the art to which it appertains to make and use the same.

This invention relates to a novel hoe, and has for its object the production of a simple and efficient device of this character comprising a detachable handle and a plurality of blades adjustable laterally to form, in effect, a single blade or a number of separate blades in order that the device may be arranged to accommodate varying conditions and classes of work.

To the accomplishment of this and other objects subordinate thereto the invention consists in certain novel details of construction and in the arrangement of parts hereinafter described.

Referring to the drawings, Figure 1 represents a perspective view of my hoe complete. Fig. 2 is a detail view, on an enlarged scale, of the head or cross-bar; and Fig. 3 is a detail view of one of the blades or hoes detached. Fig. 4 is a detail view of the reduced end of the handle.

Referring to the figures on the drawings, 1 indicates a handle of suitable size, shape, and material provided with a reduced end 2, terminally screw-threaded, as indicated at 3, for the reception of a nut 4, designed to secure a head or cross-bar 5 to the handle. This head or cross-bar is of any suitable length and is provided at its center with an aperture 6, through which the reduced end of the handle extends, and with a pair of longitudinal slots 7, in which the shanks 8 of hoes or blades 9 are adjustable toward or from the handle.

Any suitable mechanism may be provided for fixing the shanks 8 in their adjusted positions; but I prefer to provide nuts 10, screwed upon the shanks upon opposite sides of the head 5 and designed by being screwed tightly against the opposite sides thereof to retain the shanks in their proper relative positions.

The reduced portion of the handle which passes through the head is preferably provided with a spline 11, which fits into a groove 12, extending from the bore or aperture 3, the purpose of this detail of construction being to prevent turning of the head upon the handle, although in most instances the head will be securely clamped and retained by the nut 4 in an obvious manner.

It will be apparent from the foregoing that I have produced a simple garden-tool provided with a plurality of independently-adjustable hoes, which may be drawn together to form, in effect, a single blade, as illustrated in dotted lines in Fig. 1, or may be adjusted to bring the blades into proper relations to accommodate varying conditions under which it is desired to employ the tool; but while the construction illustrated and described appears to comprehend a preferable embodiment of my invention I do not care to limit myself to the structural details set out, but reserve the right to change, modify, or vary them at will within the scope of my invention. It will also be apparent that by the provision of the nuts 10, arranged in pairs upon the shanks 8 of the hoe-blades, longitudinal adjustment of the blades relative to the head 5 may be effected. For example, it may be found desirable to locate one of the blades 9 close to the head 5 and the other some distance in advance thereof. This independent longitudinal adjustment may be readily effected by changing the relative location of the nuts 10 10 on the shank 8.

Having thus described my invention, what I claim as new, and desire to secure by Letters Patent, is—

In a garden implement, the combination of a handle, having a reduced lower end which is screw-threaded, and provided with a spline, a head having a central opening therein, provided with a groove at one point through which the reduced end of said handle extends with the spline thereon fitting within said groove, the said head being further provided with elongated slots upon opposite sides of its central opening, a nut screwed upon the reduced end of said handle for the purpose of retaining the head thereon, a plurality of blades provided with threaded shanks extending through said slots, a plurality of nuts upon each of said shanks located upon opposite sides of the head, by means of which said blades may be laterally and longitudinally adjusted with respect to said head and secured in place thereon.

In testimony whereof I affix my signature in presence of two witnesses.

CHAS. W. WATSON.

Witnesses:
MAGGIE DICKENS,
A. M. DICKENS.